United States Patent

[11] 3,560,764

[72] Inventor Joseph J. McDowell
Wappingers Falls, N.Y.
[21] Appl. No. 14,787
[22] Filed Mar. 2, 1970
[45] Patented Feb. 2, 1971
[73] Assignee International Business Machines Corporation
Armonk, N.Y.
a corporation of New York
Continuation of application Ser. No. 641,223, May 25, 1967, abandoned. This application Mar. 2, 1970, Ser. No. 14,787

[54] PULSE-POWERED DATA STORAGE CELL
10 Claims, 5 Drawing Figs.

[52] U.S. Cl. .......... 307/238, 307/205, 307/251, 307/279; 340/173
[51] Int. Cl. .......... H03k 3/286
[50] Field of Search .......... 307/205, 251, 279, 304; 340/173

[56] References Cited

UNITED STATES PATENTS

| | | | |
|---|---|---|---|
| 3,284,782 | 11/1966 | Burns | 307/251 |
| 3,309,534 | 3/1967 | Yu et al. | 307/304X |
| 3,363,115 | 1/1968 | Stephenson et al. | 307/279 |
| 3,393,325 | 7/1968 | Borror et al. | 307/205 |
| 3,395,291 | 7/1968 | Bogert | 307/205 |
| 3,395,292 | 7/1968 | Bogert | 307/221 |

*Primary Examiner*—John S. Heyman
*Attorneys*—Hanifer and Jancin & James E. Murray

ABSTRACT: This specification describes semiconductor storage cells for use in monolithic memories that perform storage and/or associative storage functions. These cells each comprise a pair of semiconductor devices which are coupled together to form a bistable circuit. The loads for the bistable circuits are other semiconductor devices which can be biased to regulate current drawn by the bistable circuit from a source for powering the bistable circuit. These current-regulating semiconductor devices are gated on and off to intermittently power the bistable circuit. During the periods in which power is gated-off, the bistable circuit is maintained in the proper operating state by charge stored in the elements of the bistable circuit.

INVENTOR
JOSEPH J. McDOWELL

BY James [signature]
ATTORNEY

PULSE-POWERED DATA STORAGE CELL

This is a streamlined continuation of application Ser. No. 641,223 filed May 25, 1967 now abandoned.

BACKGROUND OF THE INVENTION

The present invention relates to semiconductor storage cells and more particularly to semiconductor storage cells that are pulse powered to reduce power dissipation.

One problem with the use of semiconductor bistable circuits as storage cells in monolithic computer memories is that they dissipate energy and thereby cause heating of the monolithic memory modules. To keep the modules at an operating temperature it is therefore necessary that the modules be cooled. As the bit density, or the number of cells in a given area of the module, is increased the heating problems become more critical and very sophisticated and expensive cooling apparatus must be used. For this reason, dissipation of heat by the cells materially adds to the cost of monolithic computer memories and is also a limiting factor on the speed of operation of the memory and the size of the memory. Therefore, it is desirable to reduce the power dissipation of the cells.

SUMMARY

In accordance with the present invention, the power dissipated by each cell is reduced by the intermittent powering of the bistable semiconductor circuit of the cell. This is accomplished by employing semiconductor devices as the loads of the bistable circuits. These semiconductor devices have gates which control the current flow through them so that the semiconductor load devices can be turned on and off to pulse power the bistable circuits. While power is cut off from its bistable circuit, a cell retains the stored information because of charge stored in the internal and stray capacitances of the semiconductor devices comprising the cell.

It is an object of the present invention to provide new storage cells that can be fabricated into monolithic memories.

It is another object of this invention to provide a storage cell which dissipates very little power.

A further object of the invention is to provide storage cells that will maintain stored information in the absence of the power excitation.

DESCRIPTION OF THE DRAWINGS

The foregoing and other objects, features and advantages of the invention will be apparent from the following more particular description of the preferred embodiments of the invention as illustrated in the accompanying drawings of which.

Figure 1:
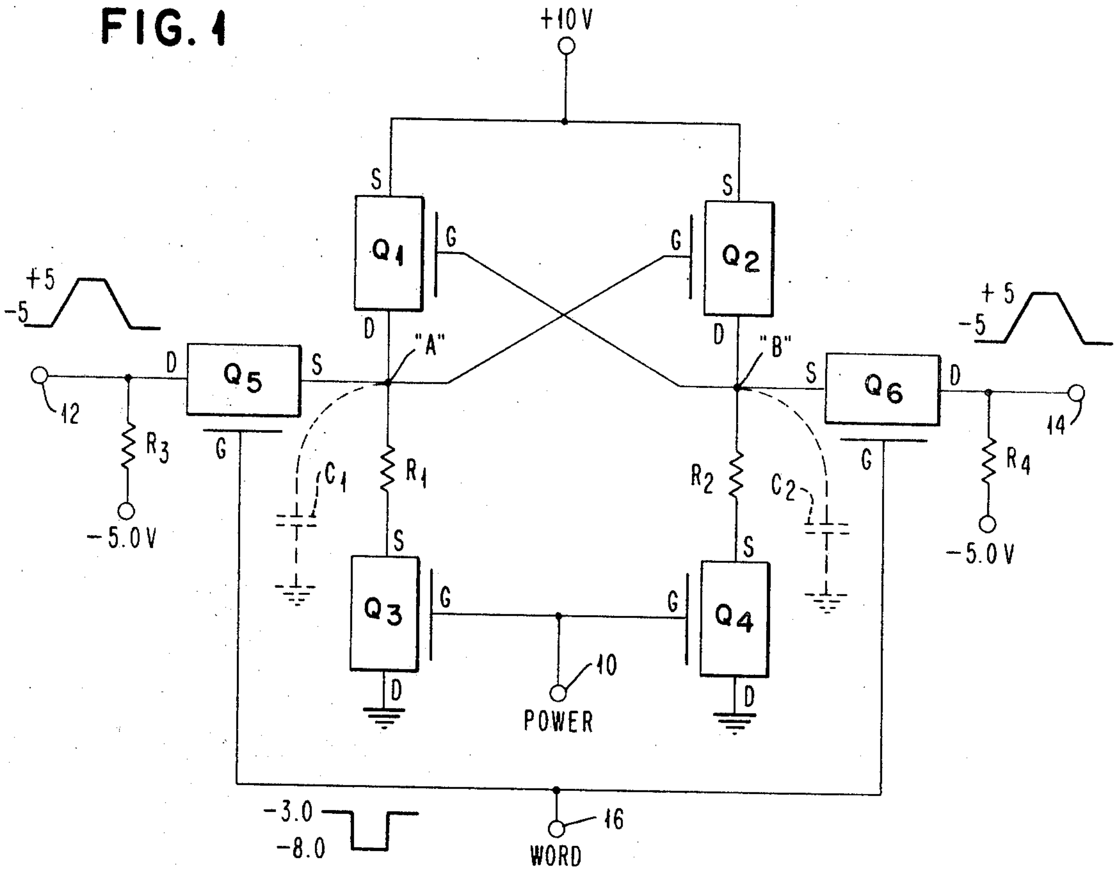
FIG. 1 is a schematic of a storage cell of the present invention.

The active devices in the storage cell illustrated in FIG. 1 are symmetrical, P channel, enhancement mode, metal oxide semiconductors (MOS). These devices are also called insulated gate field effect transistors (IGT or IGFET) and have three terminals called the gate, drain and source. In the embodiment of FIG. 1, the sources of MOS devices $Q_1$ and $Q_2$ are connected to the positive terminal of a 10 v. power supply. The drains of both the MOS devices $Q_1$ and $Q_2$ are connected through a load to ground. The load of MOS device $Q_1$ constitutes a resistor $R_1$ and an MOS semiconductor device $Q_3$ while the load of MOS device $Q_2$ constitutes a resistor $R_2$ and an MOS device $Q_4$. The gates of each of the MOS devices $Q_1$ and $Q_2$ are coupled to the drain of the other so as to form a bistable circuit in which the MOS devices $Q_1$ and $Q_2$ form a cross-coupled pair for the bistable circuit and the resistors $R_1$, $R_2$ and the MOS devices $Q_3$ and $Q_4$ act as load resistors for the bistable circuit. Though resistors $R_1$ and $R_2$ are employed in this embodiment of the invention, higher impedance devices used in place of $Q_3$ and $Q_4$ would eliminate the need for resistors $R_1$ and $R_2$.

In accordance with the present invention, the power to the bistable circuit is controlled by varying the potential at the gates of MOS devices $Q_3$ and $Q_4$. For this purpose, the gates of MOS devices $Q_3$ and $Q_4$ are connected together and to the power-gating terminal 10. The voltage at the power-gating terminal is alternately raised and lowered to periodically connect and cut off the power to the bistable circuit. During the periods in which the power is cut off from the bistable circuit the latch is held in the proper operating state by the voltage on the capacitances $C_1$ and $C_2$ which represent capacitances of the various circuit elements in the cell.

Bipolar sensing is used to read information stored in the bistable circuit. For this purpose MOS device $Q_5$ couples node A to bit sense terminal 12 and MOS device $Q_6$ couples node B to the 0 bit sense terminal 14. The gates of the MOS devices $Q_5$ and $Q_6$ are connected together and to the word line terminal 16 for the cell so that the potentials at node A and B can both be read upon the application of a single read pulse to the word line terminal 16. As will be seen later, the signals from the 1 and 0 bit sense terminals 12 and 14 due to this reading are fed into a differential amplifier and compared to determine if a 1 or 0 is stored in the cell.

When the cell is operating in its full power state, either MOS device $Q_1$ or MOS device $Q_2$ is conducting. If $Q_1$ is conducting a 1 is stored in the cell and if $Q_2$ is conducting a 0 is stored in the cell. To reduce the power dissipation of the cell during operation, devices $Q_3$ and $Q_4$ are periodically triggered on and off. While devices $Q_3$ and $Q_4$ are off there is only leakage power being supplied to the cell from the 10 v. power supply. During the periods when only leakage power is being supplied to the cell, the cell is maintained in the proper operating condition by the internal capacitances $C_1$ and $C_2$ of the MOS devices of the cell. These internal capacitances do not discharge rapidly because of the high impedance of the devices $Q_1$ through $Q_6$.

To understand just how intermittent powering of the cells works, let us first assume that a 1 is stored in the cell and devices $Q_3$ and $Q_4$ are biased conducting. This means that device $Q_1$ is conducting and device $Q_2$ is off. Conduction through $Q_1$ raises node A to approximately 10 v. while node B remains at approximately ground potential because $Q_2$ is off. It can be seen then that $Q_1$ will be maintained on and $Q_2$ off by the cross-coupling of the gates and drains of $Q_1$ and $Q_2$. Suppose now that a voltage is applied to the gates of devices $Q_3$ and $Q_4$ which is sufficient to turn devices $Q_3$ and $Q_4$ off, thus removing full power from the cell. All the MOS devices in the cell will then be in their nonconducting states. Device $Q_1$ will be kept in a "ready to conduct" state for a period after $Q_3$ and $Q_4$ are turned off by the potential difference of nodes A and B. The potentials at nodes A and B are due to the charging of the internal capacitances $C_1$ and $C_2$, while devices $Q_3$ and $Q_4$ were turned on. After the devices $Q_3$ and $Q_4$ are turned off, the charge on capacitors $C_1$ and $C_2$ changes very slowly because of the high impedances of the MOS devices $Q_1$, $Q_2$, $Q_5$ and $Q_6$, particularly the drain to gate impedances of device $Q_1$, and the gate to drain impedances of device $Q_2$. Therefore for a period after the devices $Q_3$ and $Q_4$ are turned off the potential difference of nodes A and B will be sufficient to return the storage cell to its 1 state when power is returned to the cell. However, in time, the voltages at nodes A and B will approach each other in value so that the state of the cell will not be sustained. To prevent this, the devices $Q_3$ and $Q_4$ are turned on at preset intervals to restore the charge on capacitors $C_1$ and $C_2$ and thereby maintain the potential difference of nodes A and B at the proper level.

Figure 2:
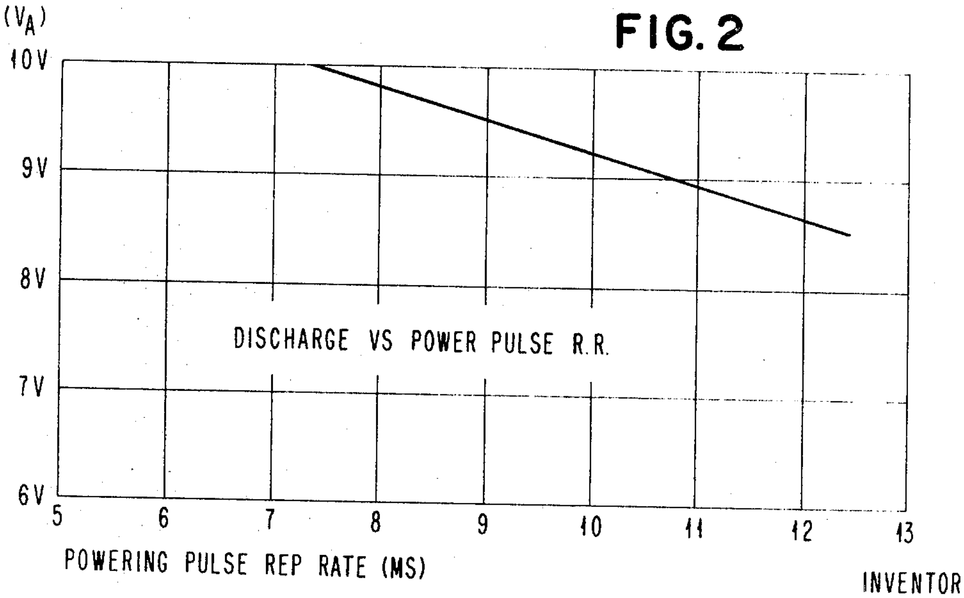
FIG. 2 is a graph showing what effect pulse powering the trigger circuit has on critical voltages of the trigger circuit.

FIG. 2 shows the effect that turning devices $Q_3$ and $Q_4$ on and off has on the potential at node A. To obtain this curve a 2 v. pulse, 50 ns. wide, was used to turn the transistors $Q_3$ and $Q_4$ on periodically. Between the pulses $Q_3$ and $Q_4$ were biased off. The repetition rate of the 50 ns. pulse is plotted along the abscissa and the voltage at node A is plotted along the ordinate. From this curve can be seen that the voltage at the node A is not appreciably discharged when the 50 ns. pulse is repeated once every 7 msec., and that even at repetition rates as low as a pulse every 12½msec., the drop in voltage at node A is quite small. The powering of the cell on a periodic basis as described above results in a considerable reduction in standby power dissipation. This reduction can be in the order of a million times less than the same cell with devices $Q_3$ and $Q_4$ maintained conducting at all times and it appears that this cell can be operated with a dissipation of only 1.5 nanowatts.

Figure 3:
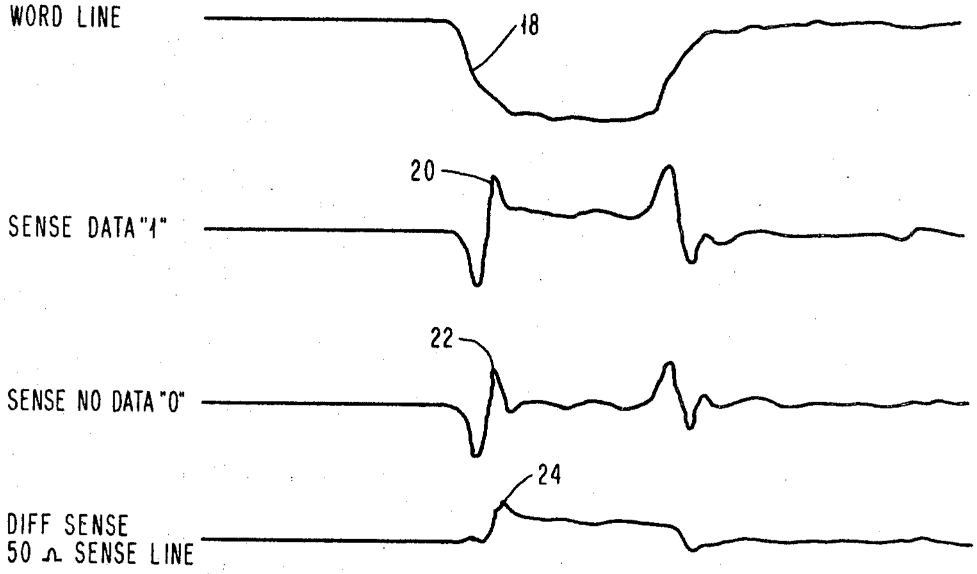
FIG. 3 are curves produced by reading the information stored in the storage cell.

So far we have been discussing conditions where devices $Q_5$ and $Q_6$ are turned off. When information is read out of the cell or written in the cell devices $Q_5$ and $Q_6$ are turned on by a negative interrogation pulse applied to the word line terminal 16. This reduces the impedance of the discharge paths for capacitors $C_1$ and $C_2$ allowing charge on these capacitors to run off through $Q_5$ and $Q_6$ to the −5 v. sources and in so doing produce pulses on the bit sense lines $B_0$ and $B_1$. FIG. 3 shows the pulses produced by interrogating the word terminal with a negative pulse. Pulse 18 is the word line pulse and pulses 20 and 22 are the responses it produces on sense line terminals 12 and 14 respectively when a 1 is stored in the cell. These two pulses 20 and 22 are subtracted from each other in a differential amplifier to give the resultant pulse shown at 24. This pulse 24 is a positive pulse which a detector would recognize as a stored 1. If a 0 is stored, the resultant pulse would have been negative.

During the read operation, devices $Q_3$ and $Q_4$ can either be on or off. If devices $Q_3$ and $Q_4$ are on, the potentials at nodes A and B are not adversely affected by the reading operation because of the current flow through $Q_3$ and $Q_4$ tends to sustain them at the proper levels. However, if devices $Q_3$ and $Q_4$ are off during the reading operation, it would appear that each conduction of devices $Q_5$ and $Q_6$ would discharge the capacitors $C_1$ and $C_2$ somewhat and that a multiplicity of readings would therefore eventually affect the state of the cell. However, this is not so. The resistance of devices $Q_1$ and $Q_2$ is very much smaller than the resistance of devices $Q_5$ and $Q_6$ and the devices $Q_5$ and $Q_6$ are connected in parallel with the devices $Q_3$ and $Q_4$, respectively. Therefore, when devices $Q_5$ and $Q_6$ are turned on they tend to effect $Q_1$ and $Q_2$ in the same manner as turning on devices $Q_3$ and Q 4. Thus reading maintains the cell in its 1 state.

To change the operating state of the cell, or in other words to write a 0 into the cell, a negative interrogation pulse is applied to the word terminal 16 to turn devices $Q_5$ and $Q_6$ on. Simultaneously therewith, voltage is applied to the 0 bit sense line terminal 14 raising the potential at the gate of device $Q_1$ sufficiently to turn device $Q_1$ off. With device $Q_1$ off, capacitor $C_1$ discharges rapidly through $Q_5$. This turns device $Q_2$ on thereby allowing the voltage at node B to rise to about +10 v. Devices $Q_5$ and $Q_6$ may then be turned off leaving the cell in its 0 storage state with device $Q_2$ conducting and device $Q_1$ nonconducting. To switch from the 0 storage state to the 1 storage state a similar process is employed except this time the potential at terminal 12 is increased to raise the voltage at node A while devices $Q_5$ and $Q_6$ are conducting. This will turn device $Q_2$ off which drops the voltage at node B and allows device $Q_1$ to go on. A write operation can also be performed under leakage power conditions as were the read operations.

Figure 4:
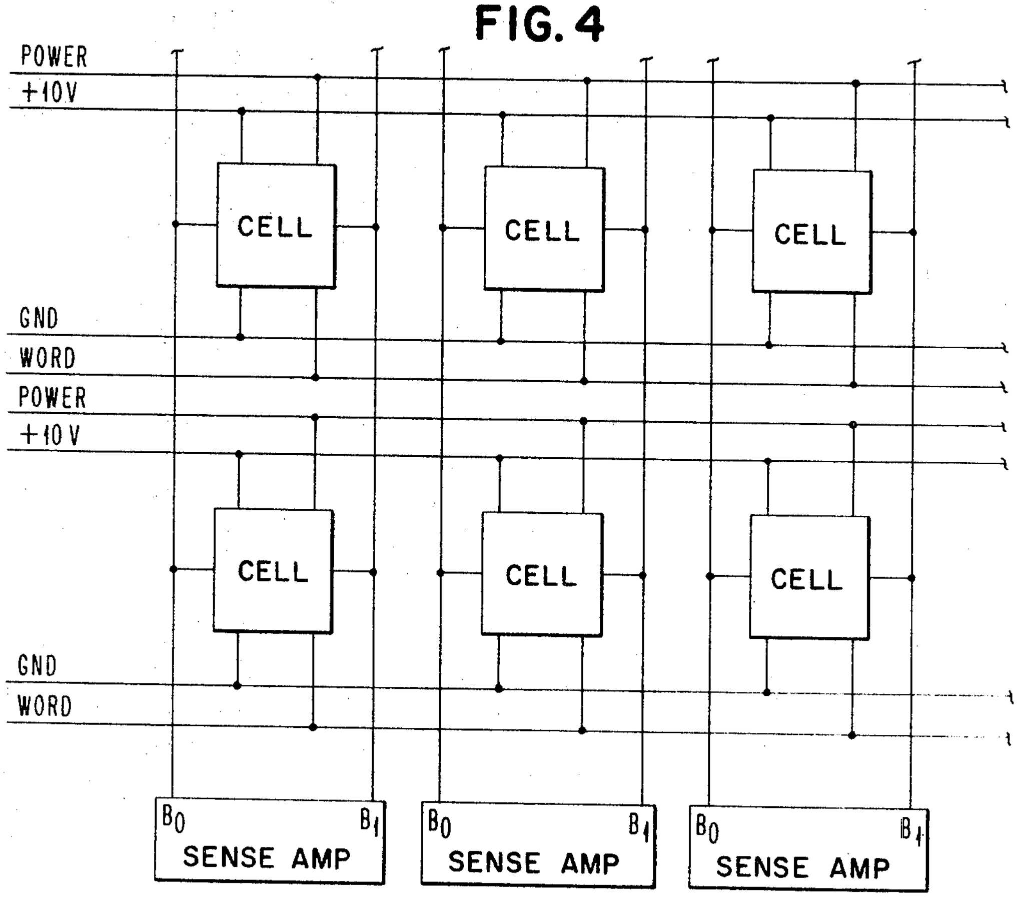
FIG. 4 is a schematic illustrating how the storage cells of the present invention can be hooked into matrices to form memory arrays.

A multiplicity of the above-described cell can be coupled together as shown in FIG. 4 and used to form matrices that perform memory functions. In such matrices the cells can be powered word line by word line, each word line at a different time. This distributes the load on the source of power and cuts the maximum power requirement of the source.

In FIG. 4, conductive connections are made between the cells and the various drive, sense and power lines for the cells. However, it may be desirable to employ transmission line techniques instead. The mentioned drive, sense and power lines servicing the storage cells are transmission lines and the cells may be coupled to them by employing directional coupling techniques to eliminate interconnections.

The cell shown in FIG. 1 can be adapted to associative memory functions. One such adaptation is shown in FIG. 5.

Figure 5:
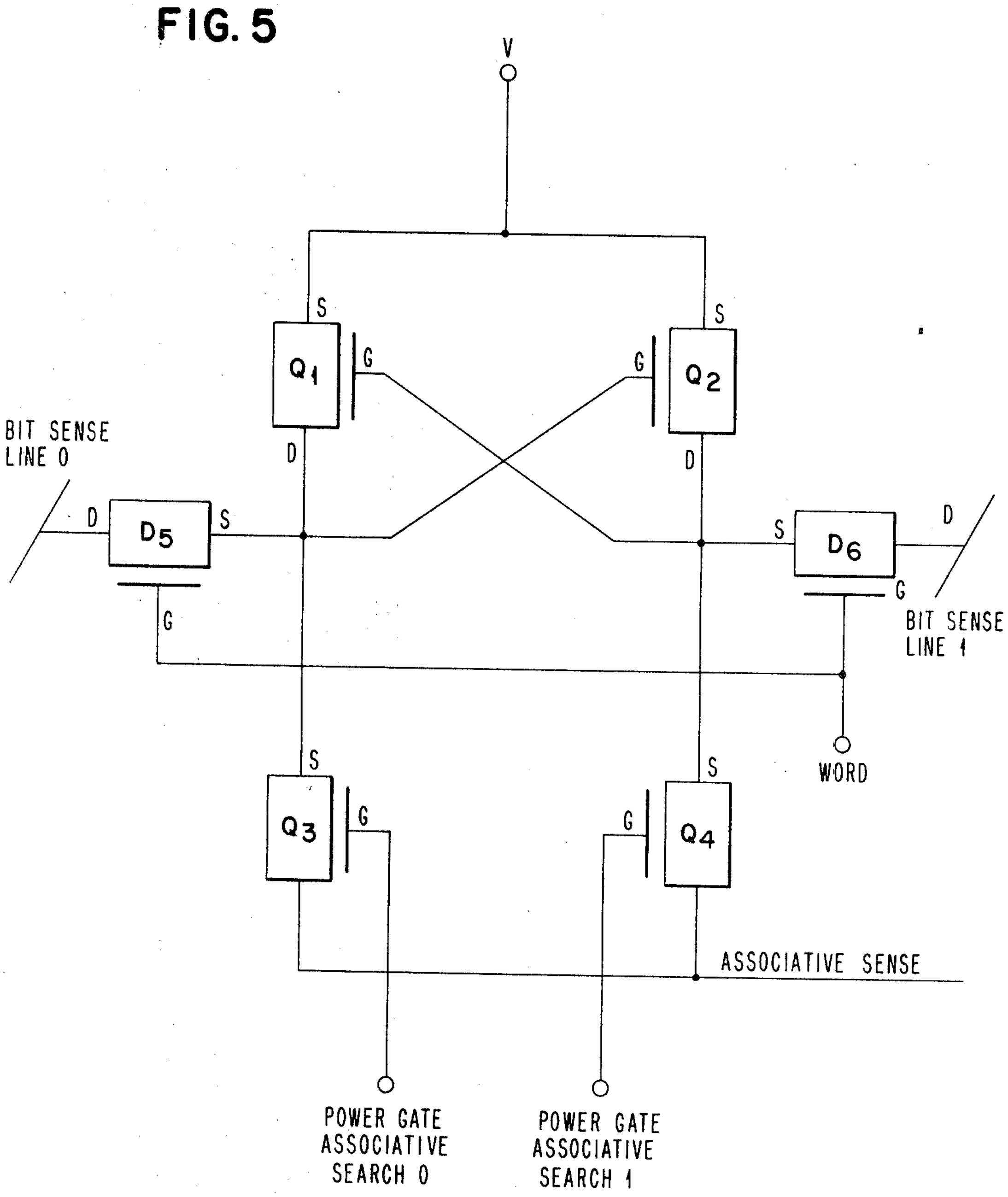
FIG. 5 is a schematic of an alternative storage cell of the present invention.

The associative memory cell of FIG. 5 differs from the memory cell of FIG. 1 in that the drains of MOS devices $Q_3$ and $Q_4$ go to an associative search sense line and the gates of devices $Q_3$ and $Q_4$ can be pulsed separately. Otherwise this cell is the same as the cell described in FIG. 1. To perform an associative search on the cell of FIG. 5, the gate of either $Q_3$ or $Q_4$ is pulsed negative. If you are associatively searching for a 0 the gate of $Q_3$ is pulsed negative. The output on the associative search sense line will then depend on whether a 0 or 1 is stored. If a 0 is stored in the cell there will be no output on the associative searched sense line and if a 1 is stored in the cell there will be a pulse on the associative search sense line. To associatively search for a 1, the gate of device $Q_4$ is pulsed negative. This produces a pulse on the associative search sense line. If a 0 is stored in the cell and no pulse a 1 is stored. In a memory matrix there would be a common associative search line for each of the cells of a word line and common associative interrogation lines for the cells with the same bit position in each of the words so that each of the cells of the word line can be interrogated separately and a single pulse on the associative search sense line will disqualify that whole word.

While the invention has been particularly shown and described with reference to preferred embodiments thereof, it will be understood by those skilled in the art that various changes in form and details may be made therein without departing from the spirit and scope of the invention.

I claim:

1. In a storage cell having a pair of cross-coupled semiconductor devices with internal capacitance connected through a load to a source of power so as to form a bistable circuit which with one of said semiconductor devices biased conductive and the other of said semiconductor devices biased substantially nonconductive stores a bit of data, the improvement which comprises:

a. a first semiconductor load device having two terminals connected in series with the source of power and said one semiconductor device and having a third control terminal for regulating the current between the other two terminals of the first semiconductor load device;

b. a second semiconductor load device having two terminals connected in series with the source of power and said other semiconductor device and having a third control terminal for regulating the current between the other two terminals of the second semiconductor load device; and c. pulse means coupled to said control terminals of said first and second semiconductor load devices to normally maintain said current turned off to reduce the power supplied through the load devices to the cross-coupled semiconductor devices below the level necessary to retain a bit of data stored in the bistable circuit while charge stored in said internal capacitance maintains said one cross-coupled semiconductor device biased conductive and said other cross-coupled semiconductor device biased substantially nonconductive and for periodically rendering said current on to charge said internal capacitances at intervals sufficiently short to prevent the loss of stored data.

2. The storage cell of claim 1 wherein said cross-coupled semiconductor devices and said first and second load devices are metal oxide semiconductors.

3. The storage cell of claim 1 including:

a. a first additional semiconductor load device in shunt with the first of said semiconductor load device, said first additional semiconductor load device having a control terminal which can be biased to render the first additional semiconductor load device conductive and nonconductive;

b. a second additional semiconductor load device in shunt with the second of said semiconductor load device, said second additional semiconductor load device having a control terminal which can be biased to render the second additional semiconductor load device conductive and nonconductive;

c. differential sense means in series with the first and second additional semiconductor load devices for sensing the state of the storage cell when the first and second additional semiconductor devices are biased conductive whereby the information in the storage cell can be sensed without destroying the information stored in the cell when the first and second load transistors are biased on nonconducting.

4. The storage cell of claim 3 wherein said cross-coupled semiconductor devices and said first and second load devices are metal oxide semiconductors.

5. In a storage cell having a pair of cross-coupled semiconductor devices with internal capacitances to store a bit of information when one of the semiconductor devices is biased conductive and the other of the semiconductor devices is biased nonconductive, the improvement which comprises:

a. input-output semiconductor means coupling said pair of semiconductor devices to bit lines for the transmission of current between the bit lines and said pair of semiconductor devices for the purpose of reading and writing the information stored in the storage cell, said input-output semiconductor means normally being biased nonconductive while charge stored in said internal capacitance maintains said one semiconductor device biased conductive and said other semiconductor device biased nonconductive but being rendered conductive to read the data stored in said storage cell; and b. biasing means coupled through the bit lines to the input-output semiconductor means for supplying charge to charge the internal capacitance through the input-output semiconductor devices while said input-output semiconductor devices are rendered conductive.

6. The storage cell of claim 5 wherein said pair of semiconductor devices are cross-coupled FET devices and said input-output semiconductor devices are FET devices.

7. In a storage cell having a pair of semiconductor devices with internal capacitances to store a bit of information when one of the semiconductor devices is biased conductive and the other of the semiconductor devices is biased nonconductive, the improvement which comprises:

a. input-output semiconductor means coupling said pair of semiconductor devices to bit lines for the transmission of current between the bit lines and said pair of semiconductor devices for the purpose of reading and writing the information stored in the storage cell, said input-output semiconductor means normally being biased nonconductive while charge stored in said internal capacitance maintains said one semiconductor device biased conductive and said other semiconductor device biased nonconductive but being rendered conductive to read the data stored in said storage cell;

b. word address pulse source means coupled to the input-output semiconductor means for rendering said input-output semiconductor means conductive to read the data stored in said cell; and c. biasing means coupled through the bit lines to the input-output semiconductor means for supplying charge to charge the internal capacitances through the input-output semiconductor devices only while said input-output semiconductor devices are rendered conductive by read pulses continually supplied by said word address pulse source means.

8. The storage cell of claim 7 including semiconductor load devices for providing paths to charge the internal capacitances of the pair of semiconductor devices while the storage cell is not being addressed for reading or writing.

9. The storage cell of claim 8 wherein the semiconductor load devices are turned on and off to supply power to charge the internal capacitances on an intermittent basis.

10. The storage cell of claim 8 wherein the semiconductor load devices are turned on and off to associatively interrogate the storage cell.